(12) United States Patent
Holmes et al.

(10) Patent No.: US 8,475,176 B2
(45) Date of Patent: Jul. 2, 2013

(54) INTEGRATED STRUCTURAL AND ELECTRICAL CONNECTOR

(75) Inventors: Alan G. Holmes, Clarkston, MI (US); Joel M. Maguire, Northville, MI (US); Andrew J. Farah, Troy, MI (US); Edward D. Tate, Jr., Grand Blanc, MI (US); Steven A. Tarnowsky, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/276,641

(22) Filed: Oct. 19, 2011

(65) Prior Publication Data

US 2013/0102162 A1 Apr. 25, 2013

(51) Int. Cl.
*H01R 33/00* (2006.01)
(52) U.S. Cl.
USPC ............................................ 439/35; 439/144
(58) Field of Classification Search
USPC .................................................. 439/35, 144
See application file for complete search history.

(56) References Cited

U.S. PATENT DOCUMENTS

| | | | | |
|---|---|---|---|---|
| 2,143,322 A * | 1/1939 | Knobel, Jr. | ..... | 280/513 |
| 2,673,965 A * | 3/1954 | Cass | ..... | 439/8 |
| 3,116,940 A * | 1/1964 | Jinesa | ..... | 280/422 |
| 3,328,741 A * | 6/1967 | Brown | ..... | 439/8 |
| 3,858,907 A * | 1/1975 | Van Raden | ..... | 280/422 |
| 4,637,674 A * | 1/1987 | Kobler | ..... | 439/371 |
| 4,842,532 A * | 6/1989 | Krause | ..... | 439/174 |
| 5,201,484 A * | 4/1993 | Thoen | ..... | 248/68.1 |
| 5,288,094 A * | 2/1994 | Putnam | ..... | 280/420 |
| 5,407,219 A * | 4/1995 | Chiu | ..... | 280/422 |
| 5,443,389 A * | 8/1995 | Hughes | ..... | 439/35 |
| 5,580,076 A * | 12/1996 | DeRoule et al. | ..... | 280/406.2 |
| 5,593,170 A * | 1/1997 | Chiu | ..... | 280/422 |
| 5,732,966 A * | 3/1998 | Menard et al. | ..... | 280/422 |
| 5,824,960 A * | 10/1998 | Markling | ..... | 174/135 |
| 5,904,261 A * | 5/1999 | Belinky et al. | ..... | 220/3.9 |
| 6,019,386 A * | 2/2000 | Morelock | ..... | 280/507 |
| 6,080,014 A * | 6/2000 | Steiler | ..... | 439/574 |
| 6,089,907 A * | 7/2000 | Shoblom | ..... | 439/528 |
| 6,155,587 A * | 12/2000 | Milazzo | ..... | 280/457 |
| 6,502,845 B1 * | 1/2003 | Van Vleet | ..... | 280/491.1 |
| 6,527,292 B2 * | 3/2003 | Adair | ..... | 280/491.3 |
| 6,575,000 B1 * | 6/2003 | Li | ..... | 70/34 |
| 6,609,725 B1 * | 8/2003 | Williams | ..... | 280/506 |
| 6,685,502 B2 * | 2/2004 | Wheeler | ..... | 439/501 |
| 6,783,266 B2 * | 8/2004 | McCoy et al. | ..... | 362/485 |
| 6,869,095 B2 * | 3/2005 | Roll et al. | ..... | 280/491.3 |
| 6,874,805 B2 * | 4/2005 | Bagley | ..... | 280/507 |
| 6,883,945 B1 * | 4/2005 | Gonzalez | ..... | 362/485 |
| 6,945,551 B2 * | 9/2005 | Blake | ..... | 280/507 |
| 6,951,346 B2 * | 10/2005 | Brackett et al. | ..... | 280/491.2 |
| 6,971,663 B1 * | 12/2005 | Blake | ..... | 280/507 |
| 6,971,883 B1 * | 12/2005 | Ridge | ..... | 439/35 |
| 7,059,158 B2 * | 6/2006 | Freeman | ..... | 70/34 |
| 7,090,238 B1 * | 8/2006 | Moore | ..... | 280/507 |

(Continued)

*Primary Examiner* — Ross Gushi
(74) *Attorney, Agent, or Firm* — Cantor Colburn LLP

(57) ABSTRACT

An integrated electrical connector comprises one or more terminals housed within a connector body. The connector body is configured and arranged to structurally join an auxiliary component to a host vehicle to which the integrated electrical connector is mechanically fixed and electrically coupled. The connector body is configured to facilitate electrically coupling electrical circuitry of the auxiliary component to the host vehicle. The connector body is configured to facilitate transmission of information among the auxiliary component and the host vehicle.

17 Claims, 2 Drawing Sheets

U.S. PATENT DOCUMENTS

| | | | |
|---|---|---|---|
| 7,118,379 B1* | 10/2006 | Wang | 439/35 |
| 7,195,505 B1* | 3/2007 | Becker | 439/282 |
| 7,338,314 B2* | 3/2008 | Thai | 439/528 |
| 7,404,591 B2* | 7/2008 | Bender | 296/164 |
| 7,410,184 B2* | 8/2008 | Roll et al. | 280/491.3 |
| 7,455,313 B2* | 11/2008 | Yokosh et al. | 280/507 |
| 7,455,524 B1* | 11/2008 | Fudala et al. | 439/35 |
| 7,498,686 B2* | 3/2009 | Capenos | 307/9.1 |
| 7,669,877 B2* | 3/2010 | Roll et al. | 280/491.3 |
| 7,789,667 B2* | 9/2010 | Zhu et al. | 439/39 |
| 7,823,904 B2* | 11/2010 | Coy | 280/506 |
| 7,850,191 B1* | 12/2010 | Kaminski et al. | 280/422 |
| 7,955,085 B2* | 6/2011 | Rotenberg et al. | 439/35 |
| 8,011,704 B2* | 9/2011 | Nees et al. | 293/106 |
| 8,079,612 B1* | 12/2011 | Tambornino | 280/506 |
| 8,192,216 B1* | 6/2012 | Puluc et al. | 439/271 |
| 8,215,656 B1* | 7/2012 | Kaminski et al. | 280/422 |
| 2001/0050471 A1* | 12/2001 | McCoy et al. | 280/504 |
| 2003/0186564 A1* | 10/2003 | Rhude | 439/35 |
| 2004/0038557 A1* | 2/2004 | Mattern et al. | 439/35 |
| 2005/0037632 A1* | 2/2005 | Ihde | 439/35 |
| 2005/0176265 A1* | 8/2005 | Jacobs | 439/35 |
| 2005/0225053 A1* | 10/2005 | Roll et al. | 280/491.3 |
| 2007/0072441 A1* | 3/2007 | Chang | 439/35 |
| 2007/0072461 A1* | 3/2007 | Williams et al. | 439/144 |
| 2008/0113522 A1* | 5/2008 | Wagner | 439/35 |
| 2008/0272699 A1* | 11/2008 | Capenos | 315/77 |
| 2008/0280460 A1* | 11/2008 | Fudala et al. | 439/35 |
| 2009/0029565 A1* | 1/2009 | Mueller et al. | 439/35 |
| 2009/0176382 A1* | 7/2009 | Chen | 439/35 |
| 2009/0181555 A1* | 7/2009 | Cummings et al. | 439/35 |

* cited by examiner

INTEGRATED STRUCTURAL AND ELECTRICAL CONNECTOR

FIELD OF THE INVENTION

The subject invention relates generally to structural and electrical connectors and more specifically to an integrated structural and electrical connector for electrically and structurally coupling an auxiliary component to a vehicle.

BACKGROUND

Useful range of conventional electric vehicles is limited by battery capacity. To extend range, hybrid vehicle concepts incorporating an engine and a generator have been considered. One drawback of such concepts, however, is the weight and volume penalties of carrying the engine and generator with the vehicle, particularly where the vehicle is to be used primarily for short-range daily commutes with only occasional need for extended range. Therefore, a need has been recognized for attaching an auxiliary power unit or another electrically active device to the rear of an electric vehicle when it is desirable to extend the useful range of the vehicle and to detach the auxiliary power unit or another electrically active device from the rear of the electric vehicle when additional useful range is not needed. This device may include a tank of fuel and either a fuel cell or an engine and an electrical generator, so it may have a substantial mass, fifty kilograms, for example, and therefore require a robust structural connection to the vehicle to remain in place during vehicle operation, especially over rough roads, where the connection may need to bear forces several times the weight of the device. This device may produce a level of electrical power that is sufficient to meet the average power demand during sustained driving over long distances, ten kilowatts, for example, so a high-capacity electrical connection may also be required.

The use of trailer hitches is fairly common for mechanically attaching accessories such as trailers to the rears of vehicles. In one common embodiment, a hitch receiver is permanently affixed to the frame of a vehicle and comprises a female body with a square opening for receiving and mechanically coupling with a mating, square, male element of a trailer hitch. The trailer hitch may comprise a ball for hitching a trailer to the vehicle. Such a trailer hitch, which is configured for mating with a hitch receiver, is often called a "receiver hitch", to distinguish it from a hitch that itself is affixed to a vehicle, such as by welding or bolting. The hitch receiver may alternately be used to attach a cargo rack to the vehicle configured for carrying luggage, bicycles, skis, or other equipment.

To provide electrical power to the trailer or other accessories attached via the hitch receiver, an electrical connection pad is often mounted to the rear of the vehicle near the hitch receiver and apart from it. Such electrical connection pads provide a location where an electrical connector associated with the trailer or other accessory may be electrically coupled with the systems of the vehicle after the trailer or other accessory has been mechanically coupled to the vehicle via the hitch receiver. Alternately, a connector may be permanently attached to the vehicle by only its wires and provide a location where an electrical connector associated with a trailer or other accessory may be electrically coupled.

One common variety of electrical connector associated with a vehicle hitch has a flat or rectangular cross section with a plurality of terminals arranged in one or more rows. Another variety of hitch electrical connector has a generally round cross-section, with its terminals arranged in a circular pattern. Each of these configurations may include between four and seven terminals. In connectors having four terminals, the terminals typically provide a basic electrical connection for providing power to the accessory for activating running lights, turn signals, and brake lights. The fourth terminal provides an electrical ground.

In connectors having five terminals, three terminals power the three lighting functions (running lights, the turn signals, and the brake lights). The fourth terminal provides a ground, and a fifth terminal is provided for electrically deactivating the hydraulic surge brakes of a trailer when backing. Therefore, the fifth terminal is often coupled to the backup lights of the vehicle.

In connectors having six terminals, three terminals power the three lighting functions (running lights, the turn signals, and the brake lights), and the fourth terminal provides a ground. The fifth terminal provides a "hot" lead for charging a battery mounted on the trailer or accessory such as is commonly used with electric trailer brakes, and the sixth terminal facilitates communication of an on/off signal for activating/deactivating the brakes. In connectors having seven terminals, all the functions of the six-terminal connector are provided, and an additional terminal provides for back-up lighting.

Notably, each of these connectors are mounted externally to the hitch receiver and configured to provide power from the vehicle to the trailer at current levels suitable to power vehicle lighting or for trickle-charging a battery or for providing a signal for activating or deactivating a brake system. Moreover, these conventional connectors are typically configured for shielding a twelve-volt potential against inadvertent grounding. Unfortunately, such accessory connectors are typically not designed and configured for carrying electrical power from an auxiliary power unit to the vehicle, particularly at power levels suitable for charging or powering the vehicle. In addition, the higher voltages (e.g., up to 400 volts) associated with the power systems of electric vehicles require greater shielding than that provided by conventional connectors. Finally, the requirement to employ an electrical connector separately from, and in addition to, the mechanical attachment provided by the hitch receiver adds an element of complexity and unreliability to the process of attaching and detaching such an auxiliary power unit.

Accordingly, it is desirable to have an electrical connector that can provide the power and signal carrying capabilities required by electric vehicles such as for controlling an auxiliary power unit and for carrying power from the auxiliary power unit to the vehicle in a convenient, reliable and safe manner. It would further be advantageous to have an electrical connector configured for structurally supporting an auxiliary power unit electrically and mechanically coupled to the rear of a vehicle. It would also be advantageous to have an electrical connector that is configured for serving as a mechanical trailer hitch receiver.

SUMMARY OF THE INVENTION

In one exemplary embodiment of the invention, an integrated structural and electrical connector comprises one or more terminals housed within a connector body. The connector body is configured and arranged to structurally join an auxiliary component to a host vehicle to which the integrated electrical connector is mechanically fixed and electrically coupled. The connector body is configured to facilitate electrically coupling electrical circuitry of the auxiliary component to the host vehicle. The connector body is also configured to facilitate transmission of information among the auxiliary component and the host vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
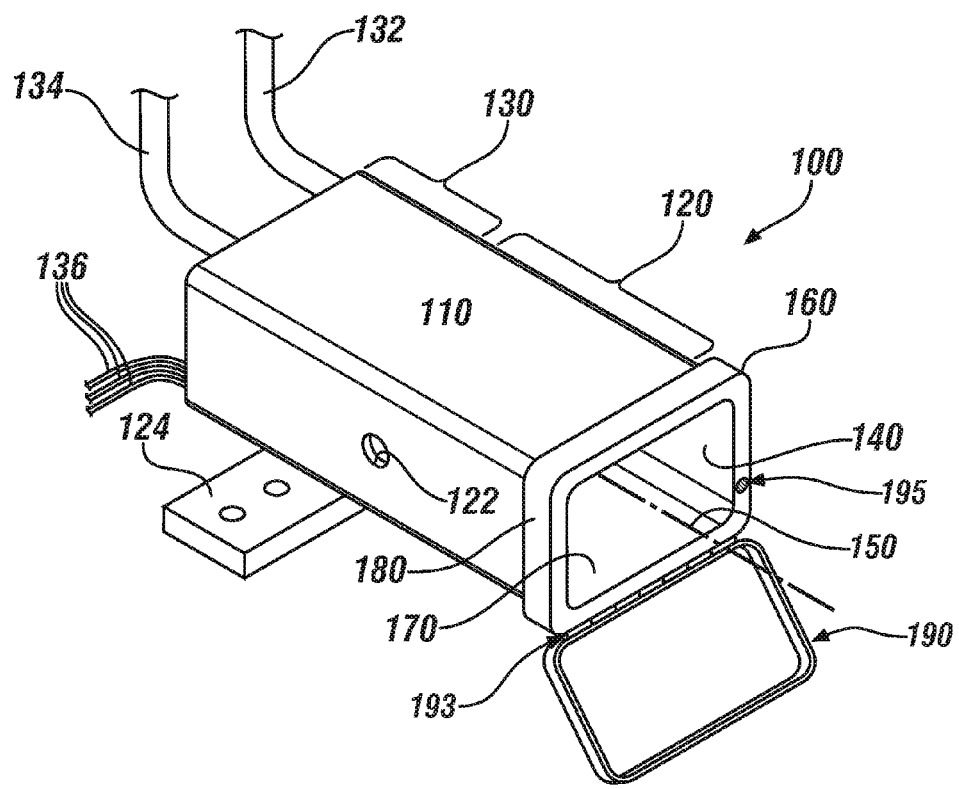
FIG. 1 is a perspective drawing of a female exemplary integrated structural and electrical connector.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIGS. 1-4 show an integrated structural and electrical connector 100, 200 that includes one or more electric power terminals 332, 334 housed within a connector body 110, 210. The female connector body 110 is configured and arranged to mate with, and structurally support, a male connector body 210 and an auxiliary component 420 such as a cargo platform, a trailer hitch, or a generator. Likewise, the male connector body 210 is configured and arranged to mate with, and to be structurally supported by, the female integrated connector 100, while the auxiliary component 420 is charging a host vehicle or waiting to charge a host vehicle, to which connector 100 is mechanically fixed and electrically coupled as described more fully herein.

The integrated connector 100, 200 can be used in a number of applications that join an auxiliary component 420 to a host vehicle. For example, the integrated connector 200 to be joined to and/or mated with integrated connector 100 may have a primarily structural purpose, such as supporting a cargo platform or towing a trailer. Alternately, a male member of an ordinary receiver hitch, cargo rack, etc may be mated with the integrated connector 100 for a solely structural purpose. Accordingly, connector body 110 is configured to provide structural support for auxiliary components 420, to which integrated connector 100 may be joined. The connector body 110 may conform to a formal or informal standard for structural support, such as the standard for 1¼-inch or 2-inch hitch receivers.

In addition, the auxiliary component 420 to be joined may have a primarily electrical purpose. For example, the auxiliary component 420 may be an electrical appliance drawing power from the vehicle or may be a charging system supplying electrical power to the vehicle. Accordingly, connector body 110 is configured to facilitate electrically coupling with circuitry of auxiliary components to which integrated connector 100 may be joined. The electric power terminals 332, 334 within the connector body 110 may conform to a formal or informal standard for charging of an electric vehicle, by arrangement or by the voltages and currents used.

Further still, the auxiliary component 420 to be joined may have a diagnostic or informational purpose involving transmitting information to and/or from the vehicle. For example, the auxiliary component 420 may comprise a system for downloading information from the vehicle, or uploading information to the vehicle, or a combination of downloading and uploading information. Accordingly, exemplary connector body 110 is configured to facilitate joining with, and facilitating transmission of information to and/or from, auxiliary components to which integrated connector 100 may be joined. One or more electrical signal terminals 320, within the connector body 110, may conform to a formal or informal standard for charging of an electric vehicle, by arrangement or by the signals exchanged, or to a more general standard for data exchange, such as the Universal Serial Bus (USB) standard, for example.

Finally, the auxiliary component 420 to be joined may comprise a combination of the above-described attributes. For example, auxiliary component 420 may comprise a trailer requiring structural-mechanical support in addition to electrical coupling and signal communication with the host vehicle. Thus, in an exemplary embodiment, connector body 110 is configured to facilitate structurally supporting an auxiliary component while electrically coupling with circuitry of the auxiliary component and while facilitating transmission of information to and/or from auxiliary components to which integrated connector 100 may be joined.

More specifically, as shown in FIG. 1, an exemplary integrated mechanical and electrical charging connector 100 includes a connector body 110 that serves as a protective shroud for matter housed within connector 100. Connector body 110 comprises a mechanical receiver section 120 and a charging coupler section 130. The mechanical receiver section 120 and the charging coupler section 130 of connector body 110 define and enshroud a female receptacle or socket 140 (i.e., a cavity) oriented along a longitudinal axis 150. A reinforcing lip 160 is structurally coupled to the connector body 110 adjacent to an opening 170 that facilitates insertion of mating structures and/or mating electrical connectors, such as those of integrated mechanical and electrical charging connector 200, into the receptacle 140. The reinforcing lip 160 is disposed about the opening 170 and is configured so as to lend structural strength to the outboard, exposed end 180 of the connector body 110. Reinforcing lip 160 also provides a convenient structure for mounting a protective cover 190 that may be configured to seal or otherwise protect the receptacle 140 and components or structures hosted therein from contamination at times when no mating structure, such as electrical charging connector 200, is inserted into receptacle 140.

In an exemplary embodiment, a sensor or switch 195 is disposed adjacent to the protective cover 190 and configured to detect when the cover 190 is open (or closed) or that the receptacle 140 is otherwise susceptible to (or safe from) contamination. In addition, an elastomeric seal may be disposed on the protective cover 190 or on the connector body 110 adjacent to the opening 170 so as to facilitate sealing between the cover 190 and the connector body 110 and to prevent debris from entering the receptacle 140. The protective cover 190 may be joined to the connector body 110 by a hinge 193, which may be configured to bias the protective cover 190 toward a closed position sealing the receptacle 140 from contamination.

To facilitate position assurance for, and structural locking with, a male connector 200 (shown in FIG. 2) inserted into the receptacle 140, connector body 110 also defines one or more locking holes 122. Upon full insertion of a male connector 200, a latching pin lock 222 may cooperate with the locking hole 122 and the male connector 200 so as to lock the male connector 200 in a fixed position within the receptacle 140. One or more mounting struts 124 facilitates structural attachment of connector body 110 to one or more structural members (not shown) of a host vehicle 410. In an exemplary embodiment, mounting struts 124 are configured to reinforce connector body 110 against loads as may be expected to be encountered by a standard hitch receiver and to satisfy structural requirements associated with a standard hitch receiver.

In an exemplary embodiment, the receptacle 140 defined in the mechanical receiver section 120 has dimensions that are suitable for mating with a standard receiver hitch. Accordingly the receptacle 140 within the mechanical receiver section 120 is configured with sufficient depth to accommodate reception of a standard male mating structure such as a standard trailer hitch. Thus, in an exemplary embodiment, connector body 110 is configured as a standard hitch receiver. The diameter of holes 122 and their location relative to the exposed end 180 of the connector body 110 are likewise configured to accommodate secure coupling of a male mating element of a standard receiver hitch. The electrical terminals 332, 334, signal terminals 320, and structural stop 340 are all positioned at a sufficient distance from the exposed end 180 of the connector body 110 so as not to interfere with the male element of the standard receiver hitch or other similar component.

According to this exemplary embodiment, the connector body 110 of electrical integrated connector 100 is oriented along a longitudinal axis 150 and is designed and constructed to provide structural support for a mating member of auxiliary component 420, integrated connector 200, for instance. Thus, in an exemplary embodiment, connector body 110 comprises a steel outer shell of substantially square cross-section that defines a substantially square opening for receiving mating members, such as a standard receiver hitch, inserted into the opening along the longitudinal axis 150. In accordance with this embodiment, connector body 110 is configured to exhibit structural strength and to have physical dimensions suitable for performance as a standard hitch receiver (e.g., suitable for towing a trailer or for supporting a cargo-carrier or a bicycle carrier). Thus, in this embodiment, connector body 110 is rigidly fixed to the frame of a host vehicle 410 with one or more stabilizing members 124 extending transversely to the longitudinal axis such that loads exerted on connector body 110 by a mated auxiliary component 420 are suitably transmitted to the frame or other supporting structure of the host vehicle. As a result, connector body 110 exhibits sufficient structural strength characteristics as to be able to meet or exceed standard trailer hitch (and/or standard hitch receiver) requirements.

For example, in one embodiment, connector body 110 is configured to meet standard structural requirements of a class I trailer hitch. In this embodiment, connector body 110 is rated to a capacity of up to about 2001 lbs. gross trailer weight with a trailer tongue weight capacity up to about 200 lbs. In this embodiment, connector body 110 defines an approximate 1¼" square receiver opening.

In another embodiment, connector body 110 is configured to meet standard structural requirements of a class II trailer hitch. In this embodiment, connector body 110 is rated to a capacity of up to about 3500 lbs. gross trailer weight with a tongue weight capacity up to about 300 lbs. In this embodiment, connector body 110 also defines an approximate 1¼" square receiver opening.

In another embodiment, connector body 110 is configured to meet standard structural requirements of a class III weight carrying trailer hitch. In this embodiment, connector body 110 is rated to a capacity of up to about 6000 lbs. gross trailer weight with a trailer tongue weight capacity up to about 600 lbs. In this embodiment, connector body 110 defines an approximate 2" square receiver opening.

In another embodiment, connector body 110 is configured to meet standard structural requirements of a class III, weight-distributing trailer hitch. In this embodiment, connector body 110 is rated to a capacity of up to about 10000 lbs. gross trailer weight with a trailer tongue weight capacity up to about 1000 lbs. In this embodiment, connector body 110 defines an approximate 2" square receiver opening and employs a weight distribution system, which imposes a bending load on the connector body.

In another embodiment, connector body 110 is configured to meet standard structural requirements of a class IV, weight-distributing trailer hitch. In this embodiment, connector body 110 is rated to a capacity of up to about 14000 lbs. gross trailer weight with a trailer tongue weight capacity up to about 1400 lbs. In this embodiment, connector body 110 defines an approximate 2" square receiver opening and employs a weight distribution system.

In another embodiment, connector body 110 is configured to meet standard structural requirements of a class V, weight-carrying trailer hitch. In this embodiment, connector body 110 is rated to a capacity of up to about 12000 lbs. gross trailer weight with a tongue weight capacity up to about 1200 lbs. In this embodiment, connector body 110 defines an approximate 2½" square receiver opening.

In another embodiment, connector body 110 is configured to meet standard structural requirements of a class V, weight-distributing trailer hitch. In this embodiment, connector body 110 is rated to a capacity of up to about 17000 lbs. gross trailer weight with a tongue weight capacity up to about 1700 lbs. In this embodiment, connector body 110 defines an approximate 2½" square receiver opening and employs a weight distribution system.

In an exemplary embodiment, the auxiliary component 420 to be joined via integrated structural and electrical connectors 100 and 200 comprises a generator configured to be supported by the connector body 110 on a cargo platform attached to connector body 210. In this embodiment, when the connector body 210 is inserted into receptacle 140 such that connectors 200 and 100 are mated, the connector bodies 110 and 210 are mechanically coupled so as to structurally support the auxiliary component 420 upon the vehicle via connector body 110. In addition, the auxiliary component 420 is controlled based on information shared with the vehicle 410 via connectors 100 and 200. Still further, the auxiliary component 420 may be started in response to signals and using power transferred from the vehicle 410 to the auxiliary component through connectors 100 and 200, and the auxiliary component 420 may signal the vehicle 410 and provide power to the vehicle 410 via integrated connectors 100 and 200.

The connector body 110 encloses both the mechanical receiver section 120 and the charging coupler section 130. In an exemplary embodiment, an interfering feature 340 is positioned between the mechanical receiver section 120 and the charging coupler section 130 within receptacle 140. The interfering feature 340 is configured to prevent inadvertent over-insertion of mating male structures such as a receiver hitch, and therefore defines a transition between the mechanical receiver section 120 and the charging coupler section 130.

Figure 2:
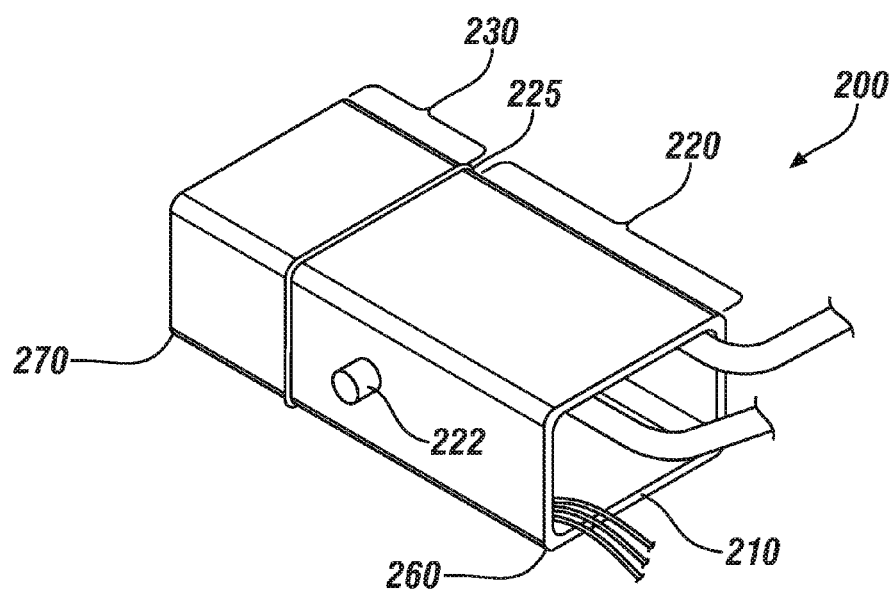
FIG. 2 is a perspective drawing of a male exemplary integrated structural and electrical connector.

At depths within the receptacle 140 greater than mechanical receiver section (i.e., in the charging coupler section 130), the connector body 110 provides added space for accommodating a charging coupler section 230 of a male connector body 210 within the receptacle 140. As shown in FIG. 2, an exemplary integrated mechanical and electrical charging connector 200 comprises a connector body 210 having outer dimensions that match the inner dimensions of receptacle 140. Connector body 210 defines a mechanical section 220 configured for insertion into receptacle 140 and for cooperating with connector body 110 to provide structural support, at its outboard end 260, for a mechanical load such as a generator and fuel supply for extending the range of an electric vehicle. Connector body 210 also supports a male charging coupler section 230 proximate inboard end 270. Male charging coupler 230 is configured for mating with charging coupler 130.

A feature 225 may be supported on the outer surface of connector body 210, the feature being positioned and configured to cooperate with an interfering feature and/or an elastomeric seal within receptacle 140. Such as seal may comprise an elastomeric material and may be positioned inside the receptacle and may be positioned and configured so as to cooperate with a male structure inserted into the receptacle in such a way as to prevent exposure of the charging coupler to contamination. Accordingly, the elastomeric seal may be integral with feature 225 or may be positioned within the mechanical section 220 adjacent to an interior surface of the mechanical section. The elastomeric seal may be sized so as to be compressed between the internal surface of the connector body and the inserted male member so as to seal against intrusion of water, dust, or other foreign matter that might interfere with the functioning or reliability of the charging coupler. A pin 222 retractably protrudes from connector body 210 and is configured and positioned so as to cooperate with a locking hole 122 and to thereby provide position assurance between receptacle 140 and the connector 200.

Figure 3:
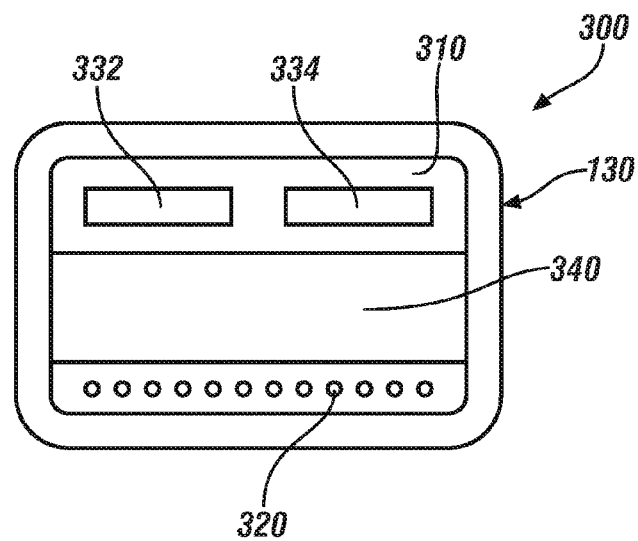
FIG. 3 is an end-view drawing of an exemplary integrated structural and electrical connector.

As shown in FIG. 3, a charging coupler 300 is configured to be fixed within charging coupler section 130 of female connector 100, FIG. 1, and to electrically couple with the end of male connector 200. Exemplary charging coupler 300 comprises an outer housing 310 of electrically insulating material such as plastic resin or other electrically insulating materials.

In addition to the above-described structural attributes, charging coupler 300 includes one or more terminals 332, 334 configured for facilitating electrical connections between the vehicle and the auxiliary component 420. Terminals 332, 334 are housed within connector body 110, and, in embodiments where connector body 110 comprises a conductive material such as steel, terminals 332, 334 are electrically isolated from connector body 110. To facilitate structural mating of connector body 110 with auxiliary components where it is desirable to avoid contact between terminals 332, 334 and the mating part of that auxiliary component, terminals 332, 334 are positioned a suitable distance from the receiver opening. This distance is configured to accommodate stable structural mating of connector body 110 with auxiliary components such as standard receiver hitches and conventional cargo racks, for instance, without contact between terminals 332, 334 and those auxiliary component (e.g., six inches from the outboard end 180 of receiver opening 170). Where it is desirable to facilitate electrical coupling between terminals 332, 334 and electrical circuitry of an auxiliary component 420, connector 200 is configured with sufficient length (e.g. connector 200 is greater than six inches long) and with terminals positioned suitably for mating with terminals 332, 334 of connector 100.

It should be noted that many auxiliary components do not have integrated electrical connectors as described herein. It is intended that the integrated connector 100 described herein be suitably configured to accommodate such auxiliary components without mechanical or electrical interference with terminals 332, 334. Thus, connector body 110 is configured to function as a standard hitch receiver.

In an exemplary embodiment, the integrated connector 100 includes two terminals 332, 334 suitable for providing electrical connection between the host vehicle 410 and circuitry of the auxiliary component 420. These charging terminals 332, 334 are electrically coupled to corresponding charging cables 132, 134. In an exemplary embodiment, charging cables 132, 134 are electrically coupled to propulsion batteries of the vehicle 410. Accordingly, charging terminals 332, 334 and charging cables 132, 134 are configured for carrying electrical power suitable for recharging batteries of an electric vehicle. Charging terminals 332 and 334 provide positive and negative (i.e., ground) power connections and are electrically isolated from the bodies 110, 210 of the connectors 100, 200 and from the structures of the vehicle 410 and auxiliary component 420. In another exemplary embodiment, a third terminal is provided to electrically connect the structures of the vehicle 410 and the auxiliary component 420 (i.e., to electrically ground the auxiliary component 420 to the vehicle 410). In still another exemplary embodiment, a third charging terminal is provided to facilitate a three-phase electrical connection for starting an engine aboard the auxiliary component and then charging the vehicle.

In an exemplary embodiment, charging coupler 300 housed within connector body 110 provides the exclusive conductive charging/re-charging connection to an electrically powered vehicle. That is, the electric vehicle may be recharged either by connection to the electrical grid or by connection to an auxiliary generator, in both cases through the integrated connector 100. The positioning of charging coupler 300 deep within the structurally sound connector body 110 provides security, safety, and protection for the charging coupler 300. In addition, the position and alignment assurance provided by the system further adds to system safety and reliability when coupling auxiliary components to a host vehicle. In an exemplary embodiment, connector 100 comprises a standard hitch receiver that houses an internal electrical connector suitably configured for coupling an external charging source to the electrical system of the vehicle. In an exemplary embodiment, this electrical connector housed within the hitch receiver obviates the need for all other charging couplers and therefore serves as the sole and exclusive mechanism for electrically coupling the charging system of the vehicle to an external charging source such as a home-based charging system or an auxiliary charging system configured for attachment to the vehicle via the hitch receiver.

In an exemplary embodiment, charging terminals 332, 334 and charging cables 132, 134 are shielded suitably to prevent undesired grounding and/or arcing between their conductors and adjacent conductive structure such as connector body 110. It should be appreciated that voltages of 400 volts or more may be experienced across the charging terminals with approximately 240 volts being commonly encountered. In an exemplary embodiment, charging terminals 332, 334 and charging cables 132, 134 are configured for continuously transmitting approximately 10 kW of power, requiring continuous current levels of approximately 40 amperes, depending upon the charging voltage.

As shown in FIG. 3, charging coupler 300 also provides one or more signal connections 320. In one embodiment, the charging coupler provides ten signal pins 320. In an exemplary embodiment, signal pins 320 are coupled to a charging controller in the vehicle. The charging controller sends and receives signals via signal pins 320 so as to facilitate communication among the vehicle, its operator and the charging system and to facilitate control over the switching and control functions necessary to manage the generation and transfer of energy between the auxiliary power source and the vehicle electrical system.

In an exemplary embodiment, two signal pins establish a serial communications bus between a charging controller and a source of charging power. A first pin provides a ground, and a second pin provides for transmission of one or more signal streams. In another exemplary embodiment, wireless communication is provided between the charging controller and the source of charging power, eliminating the need for signal pins. The pins and/or wireless communication paths enable the transmission of information such as whether and when to permit transmission of power to or from the vehicle. Other signals may relay operational information about the source of power, such as regarding its fuel supply, its health, other operational parameters, warning lights or fault codes, operational commands, power output levels, voltage levels, on/off commands, and the like.

In an exemplary embodiment, signal pins 320 may be configured to facilitate decoupling of the charging source from the battery whenever proper positioning of an auxiliary component and/or a mating electrical connector are not assured. In accordance with this embodiment, the dimensions of the mating connectors 100, 200, especially the locations along the longitudinal axis 150 of the charging terminals 332, 334, signal pins 320, holes 122, and pins 222, are configured so that a complete electrical and signal connection occurs between the mating connectors 100, 200 when, and only when, a complete mechanical connection between them has been accomplished. Accordingly such an exemplary system prevents the mechanical mating of the mating structures 220 and 120 without the attendant mating of the charging terminals 332, 334. In addition, in an exemplary embodiment, any faulty connection is sensed and/or diagnosed by the vehicle via logic built into vehicle controller. A master switch may be maintained in a disconnected state unless and until signals indicate appropriate power connections are established and appropriate communication exists between the charging controller and the source of charging power. In one exemplary embodiment, charging coupler 300 housed within connector body 110 conforms to the requirements of SAE connector standard J-1772. In still another exemplary embodiment, separation 340 is provided between signal pins 320 and charging terminals 332, 334. For example, spacing between pins 320 and charging terminals 332, 334 provides for maximum distance so as to minimize interference. Alternately, separation is provided by a grounded metal bar between the pins 320 and charging terminals 340.

Though the integrated electrical connector and related structures are described as including terminals and pins and other structures that may be interpreted as being male or female in nature, such descriptions are used for convenience only. Thus, it should be appreciated that, without deviating from the contemplated scope of the invention, the selection of any male structure in the integrated connector suitably configured for mating with a female structure of an auxiliary component could be replaced with a female structure in the integrated connector suitably configured for mating with a male structure of the auxiliary component. For instance, male connector blades of the integrated connector could be replaced with female connector cavities. For instance, the female connector 100 could comprise male charging terminals 332, 334 (e.g. blades) and male signal terminals (e.g. pins) 320 and the male connector 200 could comprise female charging terminals and signal terminals.

Figure 4:
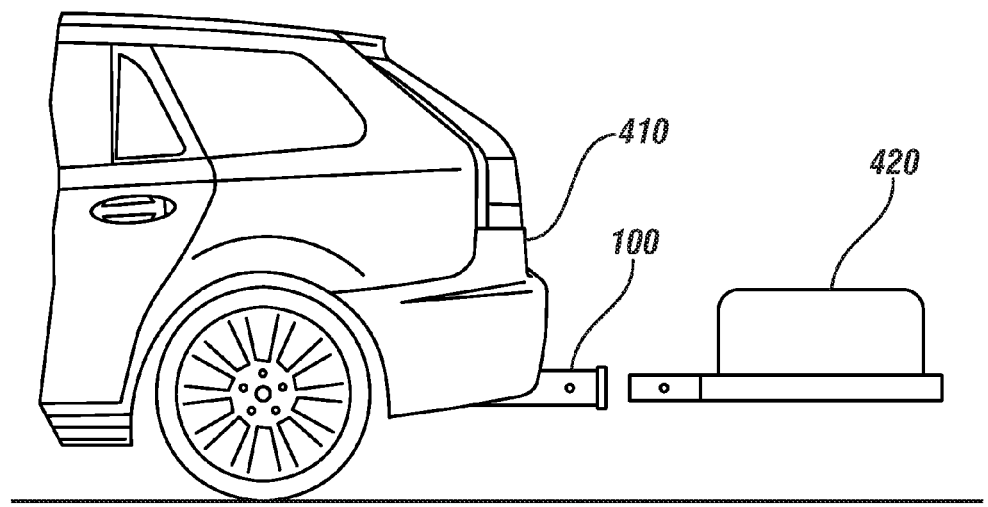
FIG. 4 is a drawing of an exemplary female integrated structural and electrical connector fixed to the rear of a host vehicle and an exemplary male integrated structural and electrical connector fixed to an auxiliary component positioned for mating with one another.

As shown in FIG. 4, an exemplary integrated structural and electrical connector 100 is fixed to the rear of a host vehicle 410 and positioned for mating with an auxiliary component 420. Accordingly, in an exemplary embodiment, the invention provides a coupler for the rear of a host vehicle with a unique combination of mechanical, electrical and signal connections. A mechanical structural connection is facilitated by a connector body that hosts electrical connections in such a way that the connector body can function as a standard receiver hitch capable of withstanding tension and shear and torsion loads. The electrical connections support high current and/or high voltage. Thus, the invention provides a convenient, reliable and safe system and method for mechanically and electrically coupling a host vehicle, such as an electric vehicle, with an accessory, such as an auxiliary generator for extending the range of the host vehicle. In an exemplary embodiment, the invention facilitates simultaneous formation of mechanical, electrical, and signal connections.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An integrated structural and electrical connector comprising:
   a connector body;
   one or more terminals housed within the connector body;
   a protective cover; and
   a sensor;
   the connector body defining a female receptacle oriented along a longitudinal axis and having an opening that facilitates insertion of a mating structure along the longitudinal axis and into the female cavity;
   the protective cover disposed adjacent to the opening and configured to protect the female receptacle from contamination;
   the sensor disposed adjacent to the protective cover and configured to detect when the protective cover is open;
   the connector body being configured and arranged to structurally join a host vehicle with an auxiliary component, to which the integrated structural and electrical connector is to be mechanically fixed and electrically coupled;
   the connector body being configured to facilitate electrically coupling electrical circuitry of the auxiliary component to the host vehicle; and
   the connector body being configured to facilitate transmission of information among the auxiliary component and the host vehicle.

2. The integrated structural and electrical connector of claim 1, further comprising a reinforcing lip disposed about the opening.

3. The integrated structural and electrical connector of claim 1, wherein the connector body defines one or more locking holes configured to facilitate structural locking with an auxiliary component inserted into the female receptacle.

4. The integrated structural and electrical connector of claim 1, further comprising one or more mounting struts configured and positioned to facilitate structural attachment of the connector body to one or more structural members of a host vehicle.

5. The integrated structural and electrical connector of claim 1, wherein the connector body comprises a steel shell of substantially square cross-section that defines an opening approximately two-inches in width.

6. The integrated structural and electrical connector of claim 1, wherein the connector body is configured to structurally support an auxiliary generator configured for recharging an electrically powered vehicle.

7. The integrated structural and electrical connector of claim 1, wherein the connector body comprises an interfering feature configured to prevent inadvertent over-insertion of an auxiliary component.

8. The integrated structural and electrical connector of claim 1, further comprising a charging coupler housed within the connector body.

9. The integrated structural and electrical connector of claim 8, wherein the connector further comprises a seal comprising an elastomeric material positioned inside the female receptacle and configured so as to cooperate with a male structure inserted into the female receptacle to prevent exposure of the charging coupler to contamination.

10. The integrated structural and electrical connector of claim 8, wherein the charging coupler is positioned so as to avoid inadvertent interference with an auxiliary component inserted into the connector body.

11. The integrated structural and electrical connector of claim 8, wherein the charging coupler is fixed within the connector body.

12. The integrated structural and electrical connector of claim 8, wherein the charging coupler includes one or more terminals configured for facilitating electrical connections between the host vehicle and the auxiliary component.

13. The integrated structural and electrical connector of claim 12, wherein the one or more terminals are positioned at least six inches from the opening.

14. The integrated structural and electrical connector of claim 12, wherein the one or more terminals are electrically coupled to a battery of the host vehicle.

15. The integrated structural and electrical connector of claim 12, wherein the charging coupler provides one or more signal connections for facilitating control over transfer of energy between the auxiliary component and the host vehicle.

16. The integrated structural and electrical connector of claim 8, wherein the charging coupler provides an exclusive connection for charging an electrically powered vehicle.

17. An integrated structural and electrical connector for a vehicle comprising:
- a hitch receiver housing defining a female receptacle with an opening at an end of the hitch receiver housing;
- a protective cover that is configured to protect the female receptacle from contamination and that is disposed adjacent to the opening;
- a sensor disposed adjacent to the protective cover and configured to detect when the protective cover is open; and
- an internal electrical connector disposed in the female receptacle and suitably configured for coupling an external charging source to an electrical system of the vehicle.

* * * * *